United States Patent [19]

Ruhl

[11] Patent Number: 4,568,263

[45] Date of Patent: Feb. 4, 1986

[54] LOCATOR WEDGE CLAMP ASSEMBLY FOR PLASTIC MOLDING MACHINE

[75] Inventor: Edward A. Ruhl, Southfield, Mich.

[73] Assignee: Sharp Die and Mold Company, a subsidiary of R & R Plastic Material, Inc., Fraser, Mich.

[21] Appl. No.: 521,881

[22] Filed: Aug. 10, 1983

[51] Int. Cl.⁴ .............................................. B28B 7/02
[52] U.S. Cl. ................................ 425/185; 425/192 R;
425/451.9
[58] Field of Search .............. 425/182, 183, 186, 190,
425/192 R, 542, 556, DIG. 5, 185, 451.9, 595,
193, 195; 264/142; 100/918

[56] References Cited

U.S. PATENT DOCUMENTS

| | | | |
|---|---|---|---|
| 2,244,842 | 6/1941 | Knowles | 425/186 |
| 3,111,895 | 11/1963 | Kraft et al. | 425/451.9 |
| 3,221,366 | 12/1965 | Couchman | 425/186 |
| 3,433,450 | 3/1969 | Brunner et al. | 425/190 |
| 3,610,021 | 3/1969 | Hopper | 100/918 |
| 4,202,522 | 5/1980 | Hanas et al. | 425/186 |
| 4,285,652 | 8/1981 | Anders | 264/142 |
| 4,290,742 | 9/1981 | Schares | 264/142 |
| 4,337,022 | 6/1982 | Laurent et al. | 425/192 R |
| 4,348,165 | 9/1982 | Vostrovsky | 425/190 |
| 4,472,128 | 9/1984 | Ruhl | 425/186 |
| 4,473,346 | 9/1984 | Hehl | 425/190 |

Primary Examiner—Jay H. Woo
Assistant Examiner—J. Fortenberry
Attorney, Agent, or Firm—Cullen, Sloman, Cantor, Grauer, Scott, & Rutherford

[57] ABSTRACT

A quick change locator wedge clamp assembly for a plastic molding machine having opposed stationary and movable platens adapted to receive, mount and support a sectional die having stationary and movable clamp plates which comprises laterally spaced pairs of opposed locator wedge clamp assemblies mounted upon and projecting from the platens. Similarly spaced pairs of opposed wedge clamp guides are mounted upon the clamp plates on one side of the molding die and have similarly spaced opposed pairs of locator slots. Each clamp assembly includes a locator key mounted upon a platen of a shape to snugly receive the corresponding wedge ramp slot for locating the molding die in a predetermined position relative to the platen. A wedge is yieldably mounted upon and extends transversely of a key and has a tapered undersurface adapted for operative retaining engagement with the adjacent wedge ramp guide. Additional clamp assemblies are mounted upon the clamp plates upon the other side of the molding die for securing the clamp plates to the platens. The sectional die includes a reciprocal ejector plate, there being at least one reciprocal knock-out bar on the molding machine. A reciprocal lifter plate within the movable clamp plate is connected to the ejector plate and removably interlocked with the knock-out bar.

12 Claims, 11 Drawing Figures

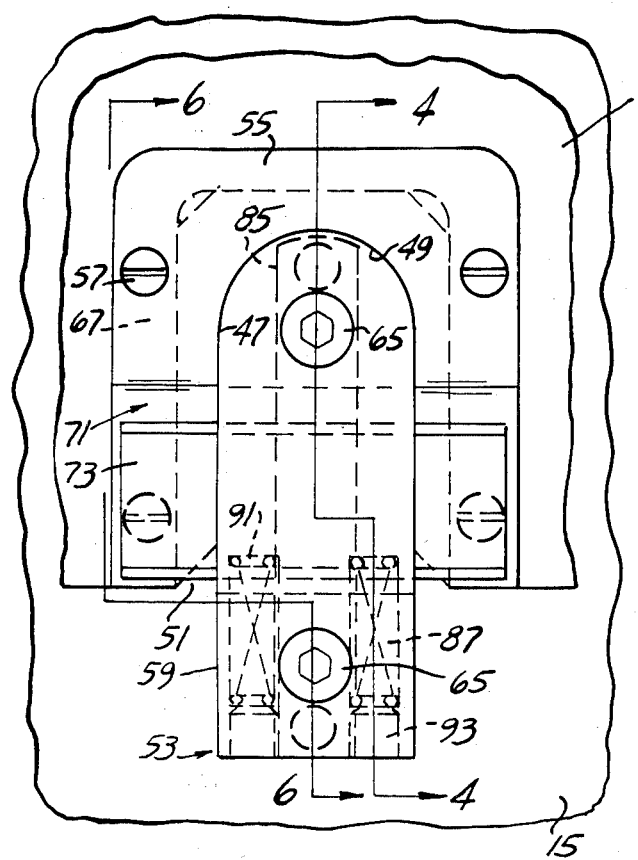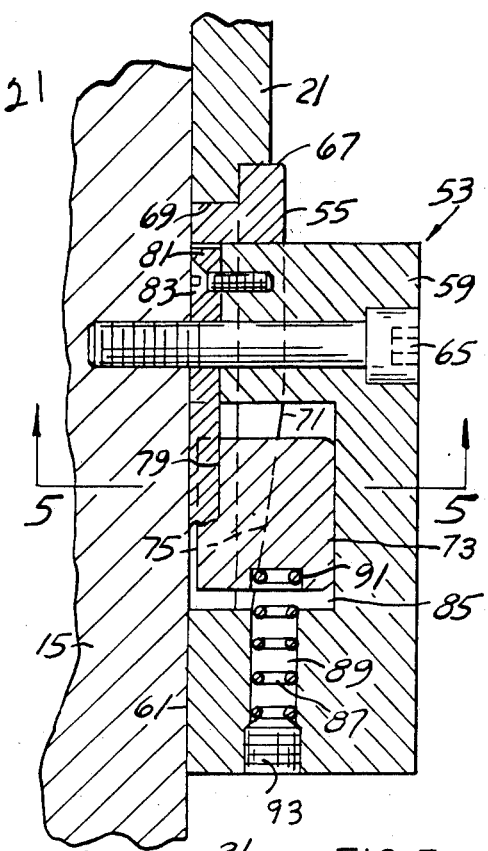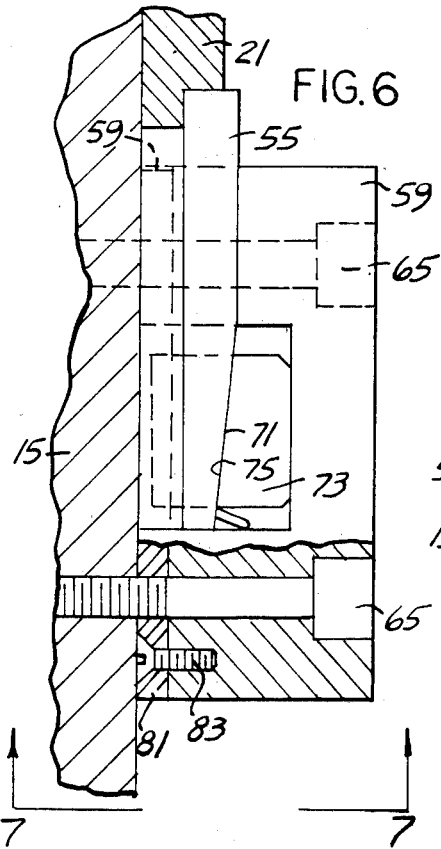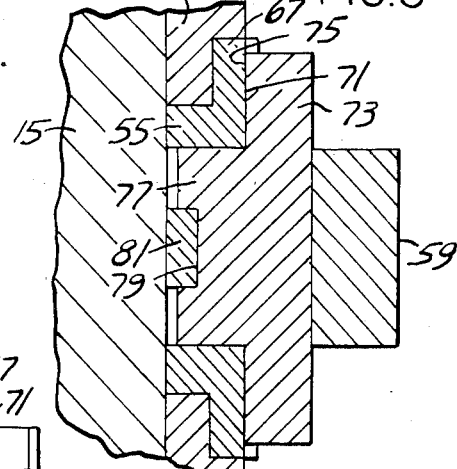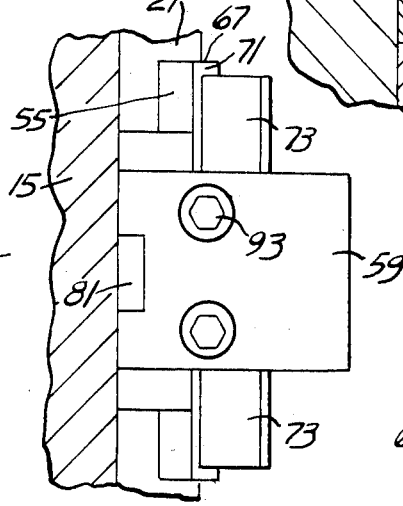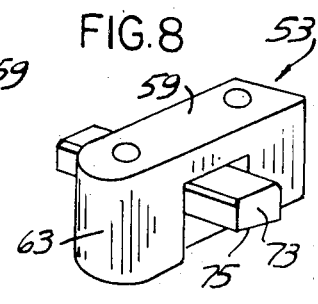

FIG. 9
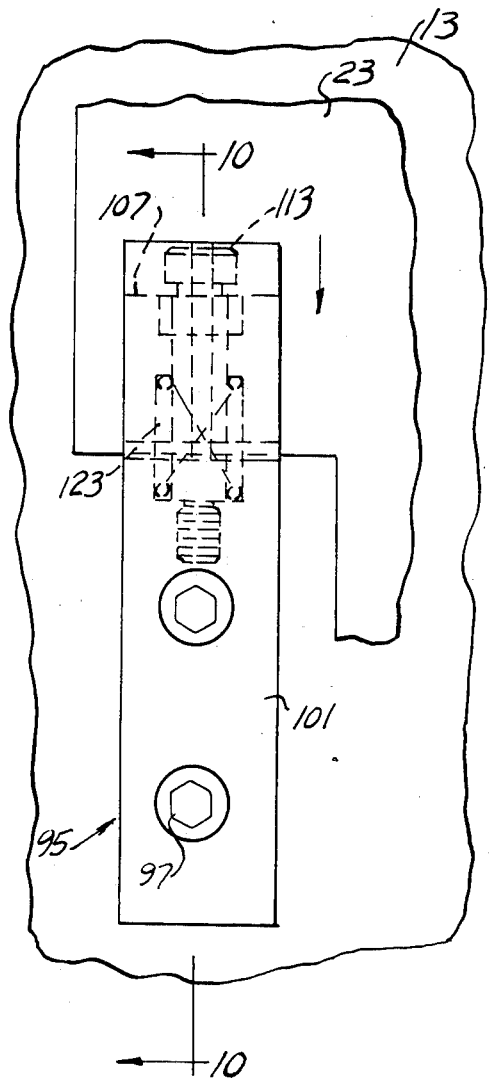
FIG. 10
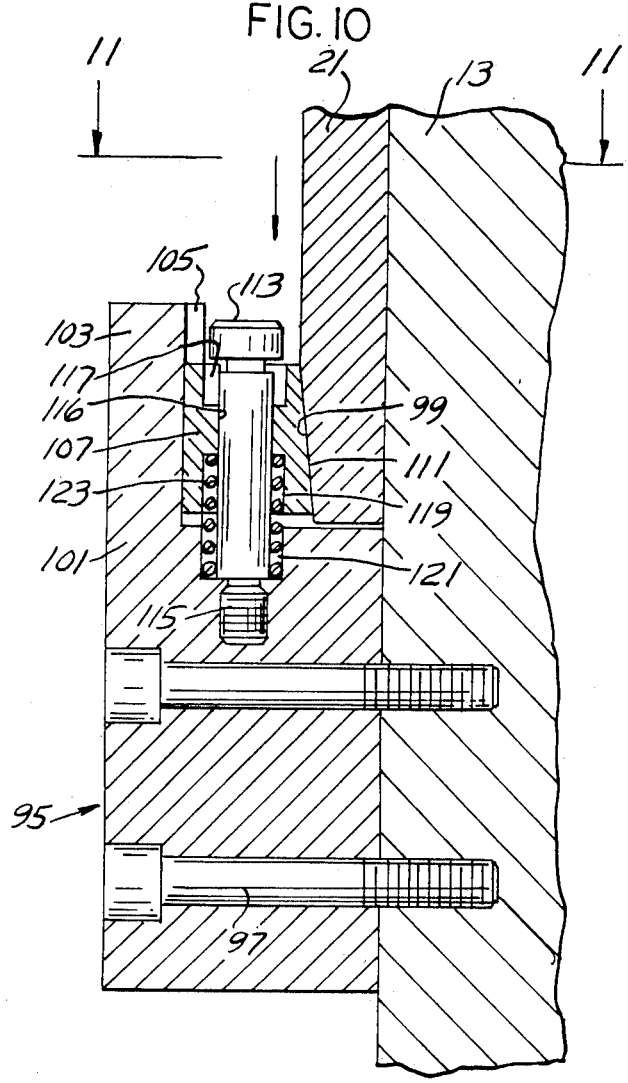
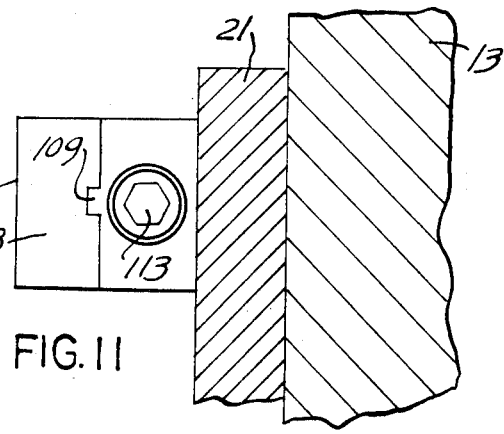
FIG. 11

LOCATOR WEDGE CLAMP ASSEMBLY FOR PLASTIC MOLDING MACHINE

BACKGROUND OF THE INVENTION

Heretofore sectional plastic molding dies having stationary and movable clamp plates or clamping slots integral to the die have been removably positioned within and between stationary and movable platens of a molding machine and suitably secured thereto. Often the plastic molding machine may employ additional plastic molding dies to replace the first mentioned molding die. The problem heretofore has been in the disassembly of a sectional plastic molding die from said platens and the reassembly of a different plastic molding die thereon required a separate securing of the clamp plates thereof to the corresponding platens of the molding machine. Locating rings upon the cavity halves were needed to effectively align the cavity tools to the respective platens. This required considerable time in reanchoring and realigning successively the second or third plastic molding die upon the molding machine so that the same molding machine may be used for a plurality of different molding operations including the use of separately employed plastic molding sectional dies.

There has existed a need by which in a simple manner a first plastic molding die may be quickly located and mounted upon the platens of a molding machine and secured thereon for a particular molding operation. Means are needed for unclamping a first plastic molding die and locating and reassembling another plastic molding die for a different job into the plastic molding machine and for clamping the same thereon.

Related Patent Application is identified as Ser. No. 500,537, filed June 2, 1983 and now U.S. Pat. No. 4,472,128.

SUMMARY OF THE INVENTION

An important feature of the present invention is to provide a quick change locator and wedge clamp assembly for a plastic molding machine having opposed movable and stationary platens adapted to receive, mount and support a sectional die having stationary and movable clamp plates.

It is a further feature to provide laterally spaced pairs of opposed lower locator wedge clamp assemblies upon the platens and wherein mounted upon the clamp plates upon one side of the plastic molding die are similarly spaced opposed pairs of locator wedge ramps with guide slots. Each locator wedge clamp assembly includes a locator key secured to the adjacent platen of a shape to snugly and guidably receive a corresponding wedge ramp guide slot for locating the molding die in a predetermined position relative to the platens. This precludes the need for the commonly utilized locating rings.

A further feature includes as a part of each locator wedge clamp assembly a spring biased yieldable wedge adapted for operative retaining engagement with the wedge ramp guide upon the adjacent clamp plate.

A further feature incorporates the use of laterally spaced pairs of opposed upper wedge clamp assemblies mounted upon and projecting from the corresponding platens of the plastic molding machine upon the other side of the molding die. Each upper wedge clamp assembly includes a wedge clamp body mounting a spring biased yieldable wedge adapted for operable retaining engagement with a corresponding upper wedge ramp upon the respective clamp plates.

It is an object of this invention to provide locator keys and wedges secured to lower portions of the respective clamp plates and associated sectional molding die to locate and anchor the clamp plates to the platens. The upper wedge clamp assemblies secure upper portions of the corresponding clamp plates to the platens. After location and clamping, upper portions of the respective clamp plates are secured to the corresponding platens by fasteners.

These and other features and objects will be seen from the following specification and claims in conjunction with the appended drawings.

THE DRAWINGS

FIG. 3 is a plan view of a lower locator wedge clamp assembly, shown in FIG. 1, on an increased scale with a clamp plate and platen fragmentarily shown.

FIG. 4 is a fragmentary section taken in the direction of arrows 4—4 of FIG. 3.

FIG. 5 is a fragmentary section taken in the direction of arrows 5—5 of FIG. 4.

FIG. 6 is a fragmentary section taken in the direction of arrows 6—6 of FIG. 3.

FIG. 7 is a fragmentary section taken in the direction of arrows 7—7 of FIG. 6.

FIG. 8 is a perspective view of the lower clamp assembly shown in FIG. 1.

FIG. 9 is a fragmentary elevational view of one of the upper wedge clamp assemblies, taken in the direction of arrows 9—9 of FIG. 1, on an increased scale.

FIG. 10 is a fragmentary section taken in the direction of arrows 10—10 of FIG. 9.

FIG. 11 is a fragmentary section taken in the direction of arrows 11—11 of FIG. 10.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Figure 1:
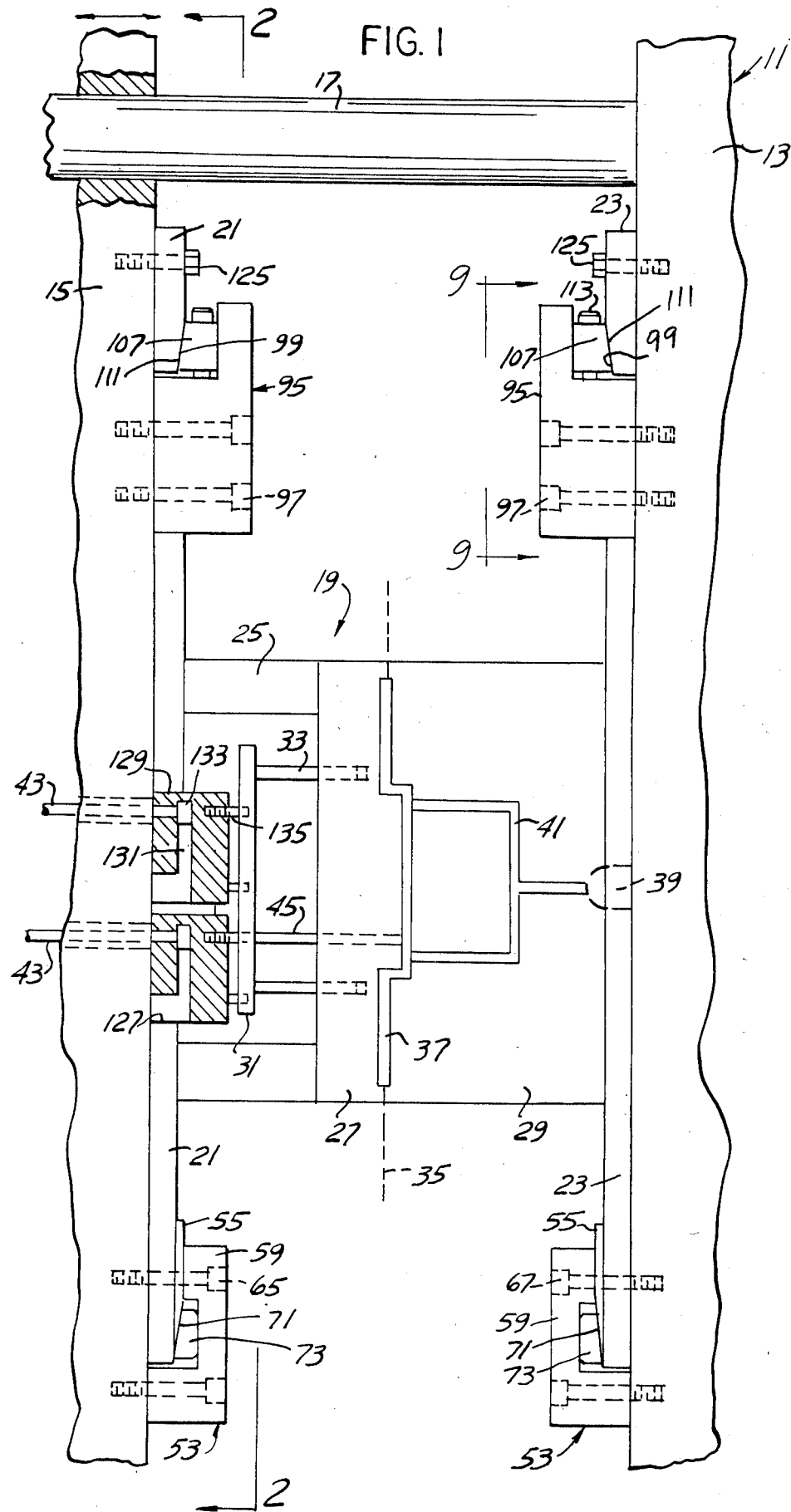
FIG. 1 is a fragmentary partly sectioned end elevational view of a conventional plastic molding machine having a pair of relatively movable platens between which is removably secured the clamp plates of a sectional plastic molding die.

Referring to the drawings, there is fragmentarily shown in FIG. 1 a conventional plastic molding machine 11 such as the well known 500 ton Cincinnati Molding Machine which has the conventional stationary platen 13 fragmentarily shown, and aligned therewith the conventional reciprocal platen 15, fragmentarily shown. Extending between said platens for maintaining registry therebetween are pairs of laterally spaced guide rods 17, one of which is shown in FIG. 1. As is conventional, the guide rods 17 are suitably secured to stationary platen 13, FIG. 1; and the reciprocal platen 15 has corresponding apertures therethrough for guidably receiving rods 17.

The conventional plastic mold machine, fragmentarily shown in FIG. 1, is adapted to receive a sectional injection plastic molding die 19, schematically shown, which includes a conventional movable clamp plate 21 and spaced therefrom a stationary clamp plate 23. As is conventional, clamp plate 21 is secured to the movable platen 15. The conventional clamp plate 23 is secured to stationary platen 13.

The conventional sectional injection plastic molding die 19 normally includes a pair of spaced rails 25 of rectangular cross-section which are mounted upon and secured to clamp plate 21.

A conventional core block 27 is mounted upon, spans and is suitably secured to rails 25. A conventional cavity plate 29 forms a part of the sectional injection plastic molding die, is guidably mounted upon and with respect to the core block 27 and is suitably secured to the stationary clamp plate 23. A conventional ejector plate 31 is interposed between rails 25 is normally spaced from core block 27 and includes conventional guide rods 33 secured thereto adapted for reciprocal movements within corresponding bores within said core block.

A conventional parting line 35 is designated in FIG. 1 between the core block 27 and cavity plate 29, between which there is defined a mold cavity 37 for the molding of a plastic article of a predetermined shape. As is conventional, the clamp plate 23 employs a centrally disposed sprew aperture 39 connected to the transverse passages 41 adapted for delivering pressurized plastic material from the molding machine for entering the mold cavity 37.

Normally there are provided within the conventional plastic molding machine and extending through the movable platen 15 thereof spaced pairs of conventional knock-out bars 43, fragmentarily shown. These are adapted for connection to ejector plate 31. At a particular time during retraction of the movable platen 15 the connected ejector pins 45 move through corresponding bores within the core block 27, for lifting and separating the molded article from cavity 37 during separation of the sectional portions of the plastic molding die 19.

The foregoing description of the environment in which the present invention is applied is reasonably conventional and a further description of the detail, function and operation of the injection plastic molding die 19 is omitted. Plastic molding dies are conventional and well known in the art.

Figure 2:
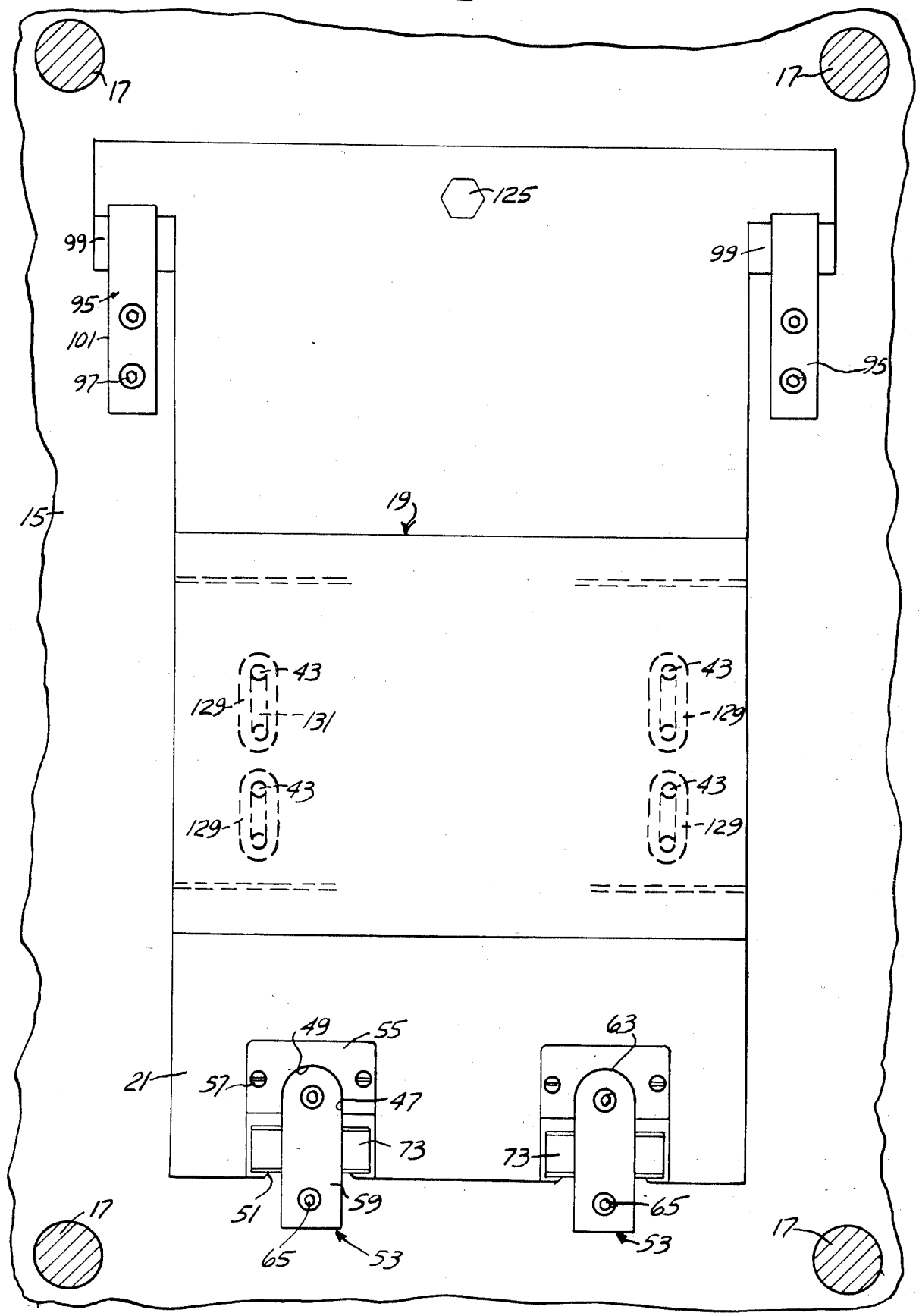
FIG. 2 is a fragmentary elevational view of the movable clamp plate secured to a movable platen by upper and lower wedge clamp assemblies, taken in the direction of arrows 2—2 of FIG. 1.

Laterally spaced pairs of opposed locator wedge clamp assemblies 53, FIG. 2, shown in a perspective, FIG. 8, are mounted upon and project from the respective platens 13 and 15, FIG. 1. These are adapted for cooperative registry within corresponding laterally spaced pairs of locator slots 47 formed within the spaced edge ramp guides 55. Said guides are secured at 57 to the bottom edges of clamp plates 23 and 21. Said clamp assemblies are upon one side of the plastic mold die 19. Each of the locator slots 47 has a semicircular portion 49 at the inner end thereof. Diverging guide portions 51 at their outer ends are adapted to cooperatively receive the corresponding locator key 59 of the wedge clamp assembly 53, shown in FIGS. 3 through 8.

Each locator key and clamp assembly 53 includes an elongated body 59. One end 63 of the key body is semi-circular and adapted to be received within the corresponding semi-circular portion 49 of slot 47 within each of the wedge ramp guides 55.

Key body 59 on its bottom surface 61, FIG. 4, registers with the corresponding platens 13 and 15 and is secured thereto by fasteners 65.

Each of the wedge ramp guides 55 includes a marginal flange 67, FIGS. 3 through 7 which nests within a corresponding recess 69, FIG. 4, formed within the respective clamp plates 21 and 23. Each of the wedge ramp guides has an outwardly extending tapered wedge surface 71 having a downward taper of 5 degrees, approximately.

Forming a part of the locator wedge clamp assembly 53, there is provided a transverse wedge 73 having a tapered undersurface 75, FIGS. 4 and 6, having a corresponding angle of 5 degrees, approximately. The wedge 73 is yieldably mounted within key body 59 and includes a central depending wedge block 77, FIG. 5, loosely positioned within the undercut recess 85 of key body 59. Said block has an undercut guide slot 79 longitudinally thereof within which is positioned guide plate 81 upon the undersurface of key body 59 and secured thereto by fasteners 83, FIG. 4. Thus, the guide plate constrains the wedge 73 to reciprocal rectilinear movements within recess 85 in key body 59.

A suitable spring means is housed within the key body 59 normally biasing the wedge 73 to a forward position such as shown in FIG. 4. In the illustrative embodiment, the spring means includes a pair of laterally spaced coiled springs 87, FIG. 3, nested within parallel spaced bores 89 within the key body 59 and at their one ends extending into corresponding recesses 91 within wedge block 77 forming a part of wedge 73. The opposite ends of the respective springs are adjustably retained by the corresponding set screws 93, FIGS. 3 and 4.

Thus in operation, the transverse wedges 73 within the key bodies 59 are yieldably and guidably mounted therein. Upon assembly of the molding die 19 and the corresponding clamp plates 21 and 23 into the molding machine 11 with respect to the platens 13 and 15, the corresponding wedges 73 operatively register at their undersurfaces 75 with the corresponding tapered wedge surfaces 71 upon the respective wedge ramp guides 55. Wedge 73 yields longitudinally within key body 59. The tapered surface 75 of wedge 73 is in cooperative snug securing registry with the corresponding tapered wedge surface surface 71 on the wedge ramp guides 55 respectively.

UPPER WEDGE CLAMP ASSEMBLY

As shown in FIGS. 1 and 2, additional securing and clamping means are required for anchoring the corresponding upper portions of the clamp plates 21 and 23 to the corresponding platens 15 and 13, FIG. 1 as the complete molding die 19 and associated anchor plates 21 and 23 are lowered into the molding machine.

Therefore, as the corresponding lower edge portions of the clamp plates with their associated wedge ramp guides are projected into the lower locator wedge clamp assemblies 53, corresponding spaced pairs of opposed upper wedge clamp assemblies 95, anchored at 97 upon the corresponding platens 13 and 15 cooperatively receive the upper wedge ramps 99. These are formed upon and arranged laterally of opposite sides of the corresponding clamp plates 21 and 23.

The upper wedge clamp assemblies 95 include the elongated wedge clamp body 101, FIGS. 9, 10 and 11. The respective wedge clamp bodies 101 have undercut upwardly extending overhang portions 103 which are spaced from the corresponding clamp plate, FIGS. 1 and 10, and include formed therein the guide slots 105.

The corresponding wedge 107 is yieldably positioned between the overhang 103 and the adjacent clamp plate, such as clamp plate 21, FIG. 10 and includes upon one surface a longitudinal guide flange 109, FIG. 11, which nests within slot 105. The slot and flange assure rectilinear movements for the wedge 107 movably mounted upon the corresponding wedge clamp body 101.

On the other surface of wedge 107 is a tapered wedge surface 111, inclined at an angle of 5 degrees, for illustration, approximately. Surface 111 is adapted for snug cooperative engaging registry with the correspondingly tapered upper wedge ramp 99 upon the corresponding clamp plates 21 and 23, and specifically clamp plate 21 shown in FIG. 10.

The corresponding wedges 107 are yieldably mounted upon the corresponding wedge clamp bodies 101 employing in each case an elongated headed retainer screw 113 threaded as at 115 into the wedge clamp body 101. The screw 113 extends through the bore 116 in wedge 107 and through the outer counterbores 117 and 119 therein. Coil spring 123 is nested within the bore 121 within wedge clamp body 101 and at its other end extends within counterbore 119 of said wedge for normally biasing the wedge outwardly of wedge clamp body.

The outer counterbore 117 within wedge 107 is adapted for cooperative registry with the head portion of the retainer screw 113 limiting outward movements of said wedge under the action of coil spring 123.

In operation, as the molding die 19 and its connected anchor plates 21 and 23 are projected into, against and relative to the corresponding platens 13 and 15 of the molding machine, the upwardly extending laterally spaced key bodies 59 of the corresponding lower locator wedge clamp assemblies 53, upon the respective platens 13 and 15, guidably extend into the corresponding slots in the laterally spaced wedge ramp guides 55 secured upon the lower edges of the clamp plates 21 and 23. At the same time the corresponding upper wedge clamp assemblies 95 and the corresponding wedges 107 therein snugly register with the corresponding upper wedge ramps 99 on the corresponding anchor plates.

The tapered undersurfaces 111 on the corresponding wedges 107 are in cooperative securing and frictional registry with the corresponding upper wedge ramps 99 which are similarly tapered at an angle of 5 degrees, approximately for illustration.

This provides an effective means of anchoring the mold die 19 and associated clamp plates 21 and 23 against and with respect to the corresponding platens 13 and 15 within molding machine 11. Since the molding die assembly is extremely heavy, there is sufficient friction with the weight of the molding die assembly, said die assembly is effectively secured and retained upon the platens of the molding machine.

Safety fasteners 125 extend through the corresponding anchor plates 21 and 23 and are threaded into the corresponding platens 15 and 13 of the molding machine only to assure that the molding die 19 assembly is affixed securly to the molding machine.

Schematically shown in FIG. 1, there are normally provided at least a pair of spaced knock-out bars 43 connected with some portion of the molding machine. Movable clamp plate 21, has corresponding elongated clearance slots 127 therethrough. Elongated lifter plates 129 have undercut slots 131 to receive the undercut heads 133 of the knock-out bars 43. Upon assembly of the movable clamp plate 21 of the molding die 19 with respect to the keys 59 on platen 15, the undercut heads 133 of the knock-out bars extend along the slots 131 within the lifter plates 129. The lifter plates are connected to the ejector plate 31 by fasteners 135.

The clearance slots 131 in clamp plate 21 are movable with respect to the knock-out bars 43 and at the same time, the undercut heads 133 of the knock-out bars are movably positioned with the undercut slots 131 within lifter plates 129, secured to ejector plate 31.

Once a molding job has been completed, it is a simple matter to separate the sectional plastic molding die 19 and associated clamp plates 21, 23 from the molding machine 11 merely by disconnecting the safety fasteners 125 between the clamp plates and platens and successively lifting the complete die assembly 19 and clamp plates, to disengage from the bottom wedge clamps 53 and top wedge clamps 95.

At that time, the complete sectional plastic mold die 19 may be removed from the molding machine 11 and a similar plastic mold die assembly replaced therein. A different set of core block and cavity plate are employed for a different molding operation. The advantage of this construction is that providing a uniformity of the location of the clearance slots 47 within the corresponding wedge ramp guides of the respective mold assemblies, the present quick change locator clamp assemblies may be employed which at all times are mounted upon the corresponding platens of the molding machine.

Having described my invention, reference should now be had to the following claims

I claim:

1. A quick change locator wedge clamp assembly for a plastic molding machine having opposed stationary and movable platens adapted to receive, mount and support a sectional molding die having opposed stationary and movable guidably interconnected clamp plates extending from its opposite sides, comprising;

laterally spaced pairs of opposed locator wedge clamp assemblies mounted upon and projecting from said platens and located below said die;

similarly spaced pairs of opposed wedge ramp guides secured upon said clamp plates upon one side of and below said molding die having spaced opposed outwardly opening pairs of locator slots;

each locator wedge clamp assembly including an elongated locator key located below said die mounted upon and secured to a platen and projected therefrom, of a shape and size to snugly and guidably receive a corresponding wedge ramp guide slot for locating the molding die in a predetermined position relative to said platens;

a first wedge yieldably mounted upon and extending transversely of said key having a tapered undersurface adapted to receive and for operative retaining engagement with the adjacent wedge ramp guide;

each wedge ramp guide including a tapered wedge surface having a taper corresponding substantially to the tapered undersurface of said wedge any snugly registerable therewith;

and clamping means upon said platens upon the other side of said molding die and located above said die for securing said clamp plates respectively;

said clamping means including laterally spaced pairs of opposed upper wedge clamp assemblies mounted upon and projecting from said platens respectively;

similarly spaced pairs of opposed upper wedge ramps upon said clamp plates above said dies;

each upper wedge clamp assembly including an elongated body mounted upon and secured to a platen;

and a second wedge yieldably mounted upon said body having a tapered undersurface adapted to receive and cooperatively engage the adjacent wedge ramp;

said locator keys, wedges, wedge ramp guides and clamping means removably locating and automatically securing said clamp plates and molding die to said platens, respectively;

said sectional molding die and connected wedge ramp guides and upper wedge ramps upon lowering relative to said platens nesting by gravity into snug frictional securing registry with said first and second wedges respectively.

2. In the locator clamp of claim 1, said locator key being registerable within said clamp plate and having an undercut recess longitudinally thereof;

said first wedge extending loosely through said recess and laterally outward from its opposite sides;

and spring means anchored within said locator key and bearing against and normally biasing said first wedge forwardly within said recess.

3. In the locator clamp of claim 2, guide means upon the undersurface of said key body retainingly engaging said first wedge and constraining said first wedge to rectilinear movements relative to said body.

4. In the locator clamp of claim 1, said upper wedge clamp elongated body having an undercut recess longitudinally thereof;

said second wedge being loosely positioned within said recess and guidably mounted upon said locator body;

and spring means anchored within said latter body bearing against and normally biasing said second wedge forwardly within said recess.

5. In the locator clamp of claim 4, the guide mounting of said second wedge including a cooperating slot and flange constraining said second wedge to rectilinear movements.

6. In the quick change locator clamp of claim 4, said spring means including a headed retainer screw extending through said second wedge and secured to said body;

and a coiled compression spring upon said screw interposed between said body and second wedge normally biasing said second wedge forwardly.

7. In the locator clamp of claim 1, each of said upper wedge ramps including a tapered wedge surface having a taper corresponding substantially to the tapered undersurface of said second wedge and snugly registerable therewith.

8. In the locator clamp of claim 1, said clamping means further including a safety fastener extending through each of said clamp plates adjacent said upper wedge clamp assemblies and secured to said platens, respectively.

9. A quick change locator wedge clamp assembly for securing the stationary and movable clamp plates extending from opposite sides of a plastic molding sectional die with respect to the corresponding stationary and movable platens of a plastic molding machine, each locator wedge clamp assembly including a wedge ramp guide secured upon a clamp plate upon one side of and below said molding die and having an outwardly opening guide slot;

and a locating wedge clamp including an elongated locator key mounted upon and secured to a platen below said die and projecting therefrom, of a shape and size to snugly and guidably receive the corresponding wedge ramp guide slot for locating the molding die in a predetermined position relative to said platen:

a first wedge yieldably mounted upon and extending transversely of said key having a tapered undersurface adapted to receive and for operative retaining engagement with the adjacent wedge ramp guide;

each wedge ramp guide including a tapered wedge surface having a taper corresponding substantially to the tapered undersurface of said wedge and snugly registerable therewith;

and clamping means upon a platen upon the other side of said molding die and located above said die for securing said clamp plate to a platen;

said clamping means including laterally spaced pairs of opposed upper wedge clamp assemblies mounted upon and projecting from said platens respectively;

similarly spaced pairs of opposed upper wedge ramps upon said clamp plates above said dies;

each upper wedge clamp assembly including an elongated body mounted upon and secured to a platen;

and a second wedge yieldably mounted upon said body having a tapered undersurface adapted to receive and cooperatively engage the adjacent wedge ramp;

said locator keys, wedges, wedge ramp guide and clamping means being adapted for removably locating and automatically securing said clamp plates and molding die to said platens respectively;

said sectional molding die and connected wedge ramp guides and upper wedge ramps upon lowering relative to said platens nesting by gravity into snug frictional securing registry with said first and second wedges respectively.

10. In the quick change locator clamp of claim 9, said locator key being registerable within said clamp plate and having an undercut recess longitudinally thereof;

said first wedge extending loosely through said recess and laterally outward from its opposite sides;

and spring means anchored within said locator key bearing against and normally biasing said first wedge forwardly within said recess.

11. In the quick change locator clamp of claim 10, guide means upon the undersurface of said key body retainingly engaging said first wedge and constraining said first wedge to rectilinear movements relative to said key body.

12. In the locator clamp of claim 9, said wedge ramp guide having a U-shaped marginal support flange nested within an aperture within the adjacent clamp plate, said wedge ramp guide extending through said clamp plate.

* * * * *